(12) United States Patent
Yu et al.

(10) Patent No.: US 9,746,331 B1
(45) Date of Patent: Aug. 29, 2017

(54) METHOD AND APPARATUS FOR MAP MATCHING

(71) Applicant: Marvell International Ltd., Hamilton (BM)

(72) Inventors: Jing Yu, Shanghai (CN); Jian Chen, Shanghai (CN); BoChih Liu, Shanghai (CN); Zhike Jia, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/962,803

(22) Filed: Dec. 8, 2015

Related U.S. Application Data

(60) Provisional application No. 62/091,822, filed on Dec. 15, 2014.

(51) Int. Cl.
| | | |
|---|---|---|
| *G01C 21/30* | (2006.01) | |
| *G01C 21/20* | (2006.01) | |
| *G01C 21/12* | (2006.01) | |
| *G01S 19/42* | (2010.01) | |
| *G01S 5/00* | (2006.01) | |
| *G01S 5/02* | (2010.01) | |

(52) U.S. Cl.
CPC .......... *G01C 21/206* (2013.01); *G01C 21/12* (2013.01); *G01S 5/0063* (2013.01); *G01S 5/0252* (2013.01); *G01S 19/42* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 5,941,934 | A | * | 8/1999 | Sato | G01C 21/30 340/995.22 |
| 6,023,653 | A | * | 2/2000 | Ichimura | G01C 21/30 701/446 |
| 7,962,282 | B2 | * | 6/2011 | Fujita | G01C 21/30 340/935 |
| 8,489,316 | B1 | * | 7/2013 | Hedges | G01C 21/30 701/300 |
| 9,291,713 | B2 | * | 3/2016 | Shaw | G06Q 10/04 |
| 9,373,257 | B2 | * | 6/2016 | Bonhomme | |
| 2003/0045985 | A1 | * | 3/2003 | Kobayashi | B60Q 1/085 701/49 |
| 2009/0248290 | A1 | * | 10/2009 | Fukumoto | G01C 21/26 701/532 |
| 2009/0248299 | A1 | * | 10/2009 | Fukumoto | G01C 21/3626 701/532 |

(Continued)

*Primary Examiner* — Jonathan L Sample

(57) ABSTRACT

Aspects of the disclosure provide an apparatus for determining a matched position of a mobile device in a map. The apparatus can have a map matching system that can include a link selector that is configured to select candidate links in the map based on a previous matched position and a path length threshold, and a matching processor that is configured to determine a matched link in the candidate links based on an equivalent distance from an estimated position to a link in the candidate links and determine a current matched position on the matched link. In an embodiment, the map matching system can further include an initializer that is configured to determine a matched position based on an equivalent distance from a first estimated position to an initial candidate link in the map.

18 Claims, 4 Drawing Sheets

(56) References Cited

U.S. PATENT DOCUMENTS

| | | | |
|---|---|---|---|
| 2009/0287410 A1* | 11/2009 | Kobayashi | G01C 21/30 701/533 |
| 2010/0049433 A1* | 2/2010 | Martin | G07C 5/0841 701/533 |
| 2010/0082248 A1* | 4/2010 | Dorum | G01C 21/32 701/533 |
| 2011/0015860 A1* | 1/2011 | Nesbitt | G01C 21/30 701/533 |
| 2011/0086646 A1* | 4/2011 | Gupta | G01S 5/0036 455/456.1 |
| 2011/0208496 A1* | 8/2011 | Bando | G01S 19/49 703/2 |
| 2013/0145288 A1* | 6/2013 | Zadeh | G06F 3/0484 715/753 |
| 2013/0197799 A1* | 8/2013 | Cho | G01S 5/0242 701/430 |
| 2014/0270362 A1* | 9/2014 | Najafi Shoushtari | G06K 9/6204 382/103 |
| 2014/0335887 A1* | 11/2014 | Liu | H04W 64/00 455/456.1 |
| 2014/0363156 A1* | 12/2014 | Gong | H04W 24/10 398/25 |
| 2015/0153180 A1* | 6/2015 | Ettinger | G01C 21/206 701/410 |
| 2015/0275787 A1* | 10/2015 | Dufford | F02D 29/02 701/102 |
| 2015/0275788 A1* | 10/2015 | Dufford | F02D 29/02 701/102 |
| 2016/0093210 A1* | 3/2016 | Bonhomme | G08G 1/0967 340/905 |
| 2016/0146616 A1* | 5/2016 | Ren | G01C 21/30 701/409 |

* cited by examiner

210

| FIELD NAME | DATA TYPE | MEANING |
|---|---|---|
| OBJECTID | INTEGER | IDENTIFIER OF NODE |
| SHAPE | BINARY | THE GEOMETRIC DATA OF NODE |
| XCOOR | DOUBLE | LONGITUDE OF NODE |
| YCOOR | DOUBLE | LATITUDE OF NODE |
| X_UTM | DOUBLE | X OF UTM COORDINATE |
| Y_UTM | DOUBLE | Y OF UTM COORDINATE |
| LINKID | INTEGER ARRAY | IDENTIFIER OF LINK OF WHICH THE ENDPOINT COVERES THIS NODE |
| POLYGONID | INTEGER ARRAY | IDENTIFIER OF REGION OF WHICH THE BOUNDARY CONTAINS THIS NODE |

220

| FIELD NAME | DATA TYPE | MEANING |
|---|---|---|
| OBJECTID | INTEGER | IDENTIFIER OF LINK |
| SHAPE | BINARY | THE GEOMETRIC DATA OF LINK_CENTERLINE |
| NODEIDFROM | INTEGER | IDENTIFIER OF NODE WHICH THE FROM POINT OF THIS LINK COVERES |
| NODEIDTO | INTEGER | INDENTIFIER OF NODE WHICH THE TO POINT OF THIS LINK COVERES |
| HEADING | DOUBLE | HEADING ANGLE OF LINK |
| LENGTH | DOUBLE | LENGTH OF LINK |
| WIDTH | DOUBLE | WIDTH OF LINK |

230

| FIELD NAME | DATA TYPE | MEANING |
|---|---|---|
| OBJECTID | INTEGER | IDENTIFIER OF REGION |
| SHAPE | BINARY | THE GEOMETRIC DATA OF OFFICE |
| VERTEXID | INTEGER ARRAY | IDENTIFIER OF VERTEX OF THIS REGION |
| NODEID | INTEGER ARRAY | IDENTIFIER OF NODE WHICH THE BOUNDARY OF THIS REGION CONTAINS |

*FIG. 2*

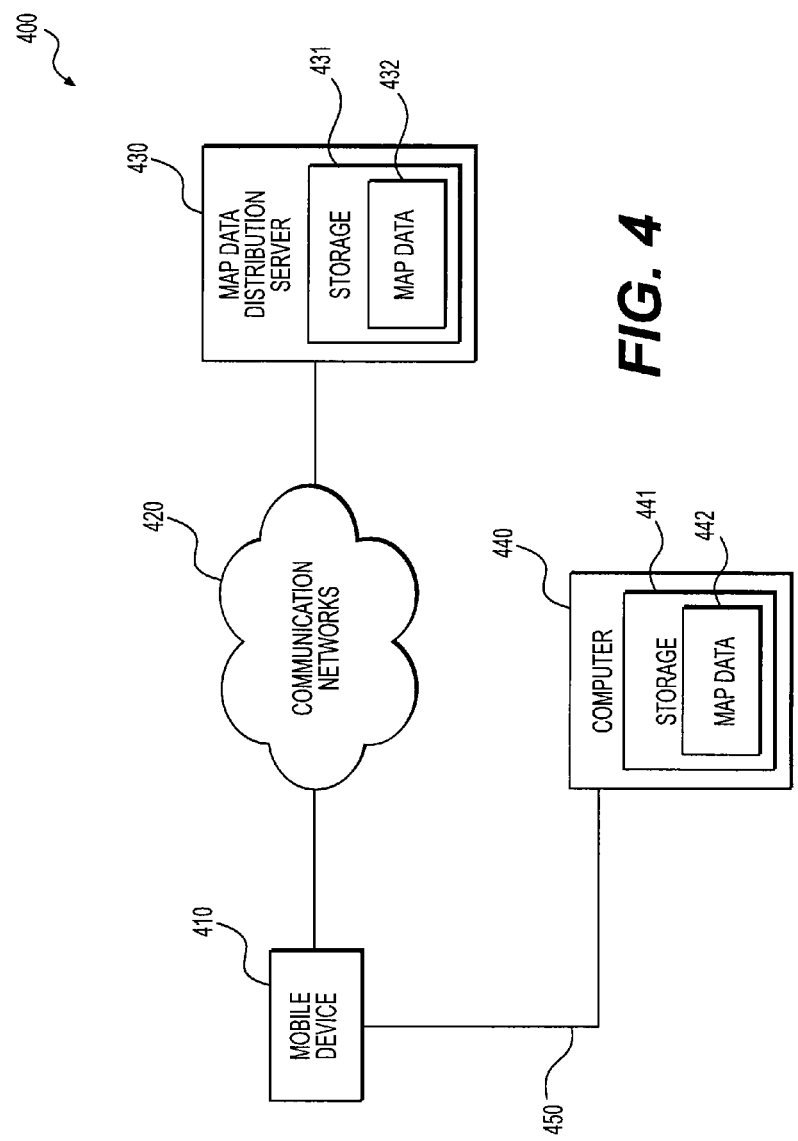

METHOD AND APPARATUS FOR MAP MATCHING

INCORPORATION BY REFERENCE

This present disclosure claims the benefit of U.S. Provisional Application No. 62/091,822, "Wireless Device with Embedded Map Matching System" filed on Dec. 15, 2014, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Map matching systems generally receive position data from other positioning systems in a mobile device, such as the Global Positioning System (GPS) embedded in a mobile phone. The position data indicates an estimated position of a user of the mobile device. The map matching system correlates the position data and road network data in a digital map to determine a road in the digital map which the user is traveling on and subsequently find a location corresponding to the estimated position on the road. In this way, the estimated position is matched onto the road in the digital map.

In some outdoor navigation applications, such as vehicle navigation using a GPS navigator, map matching operations require the navigation devices to have high processing power and storage capacity due to the complexity of the road network and the large volume of map data. Some mobile devices, such as a mobile phone, usually are not suitable for such outdoor navigation applications due to their limited hardware capabilities and/or battery capacities. However, for indoor navigation applications, because the size of an indoor floor map is small and the number of possible map links in the indoor floor map is limited, map matching system in a mobile device such as a mobile phone can be suitably used to sufficiently perform the indoor navigation.

SUMMARY

Aspects of the disclosure provide an apparatus for determining a matched position of a mobile device in a map. The apparatus can have a map matching system that can include a link selector that is configured to select candidate links in the map based on a previous matched position and a path length threshold, and a matching processor that is configured to determine a matched link in the candidate links based on an equivalent distance from an estimated position to a link in the candidate links and determine a current matched position on the matched link. In an embodiment, the map matching system can further include an initializer that is configured to determine a matched position based on an equivalent distance from a first estimated position to an initial candidate link in the map.

In an example, the equivalent distance from the first estimated position to the initial candidate link in the map can represent a combination of contributions of the minimum distance between the first estimated position and the initial candidate link in the map and a heading difference between the mobile device and the initial candidate link in the map, and the equivalent distance from the estimated position to the link in the candidate links can represent a combination of contributions of the minimum distance between the estimated position and the link in the candidate links and a heading difference between the mobile device and the link in the candidate links.

In an embodiment, the initializer can be configured to select initial candidate links based on a minimum distance threshold and a heading difference threshold, determine an initial matched link based on an equivalent distance from the first estimated position to the initial candidate link in the map, and determine the matched position on the initial matched link.

In an embodiment, the link selector is configured to select links in the map to which a path length from the previous matched position is below the path length threshold to be the candidate links. In another example, the matching processor is configured to select a link in the candidate links to which the equivalent distance from the estimated position is the shortest to be the matched link. In a further example, the matching processor is configured to project the estimated position onto the matched link to determine the current matched position on the matched link.

In an embodiment, the apparatus can further include positioning circuitry that is configured to generate position data indicative of the first estimated position and the estimated position, and heading information indicative of a heading of the mobile device, motion sensors that are configured to detect a moving state of the mobile device and provide measurements of the moving state to the positioning circuitry, and a map database that is configured to provide map data to the map matching system. In addition, the map matching system is configured to receive the position data and the heading information from the positioning circuitry and receive map data from the map database.

In various embodiments, the positioning circuitry can include one of the following positioning systems: a satellite-based positioning system, a radio-based positioning system, and a dead-reckoning system. In an embodiment, the map is an indoor floor map.

Aspects of the disclosure provide a method for determining a matched position of a mobile device in a map. The method can include selecting candidate links in the map based on a previous matched position and a path length threshold, determining a matched link in the candidate links based on an equivalent distance from an estimated position to a link in the candidate links, and determining a current matched position on the matched link. In an example, the method can further include determining a matched position based on an equivalent distance from a first estimated position to an initial candidate link in the map.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows exemplary map data formats according to an embodiment of the disclosure.

FIG. 4 shows a diagram illustrating a map data distribution system according to some embodiments of the disclosure.

DETAILED DESCRIPTION OF EMBODIMENTS

Figure 1:
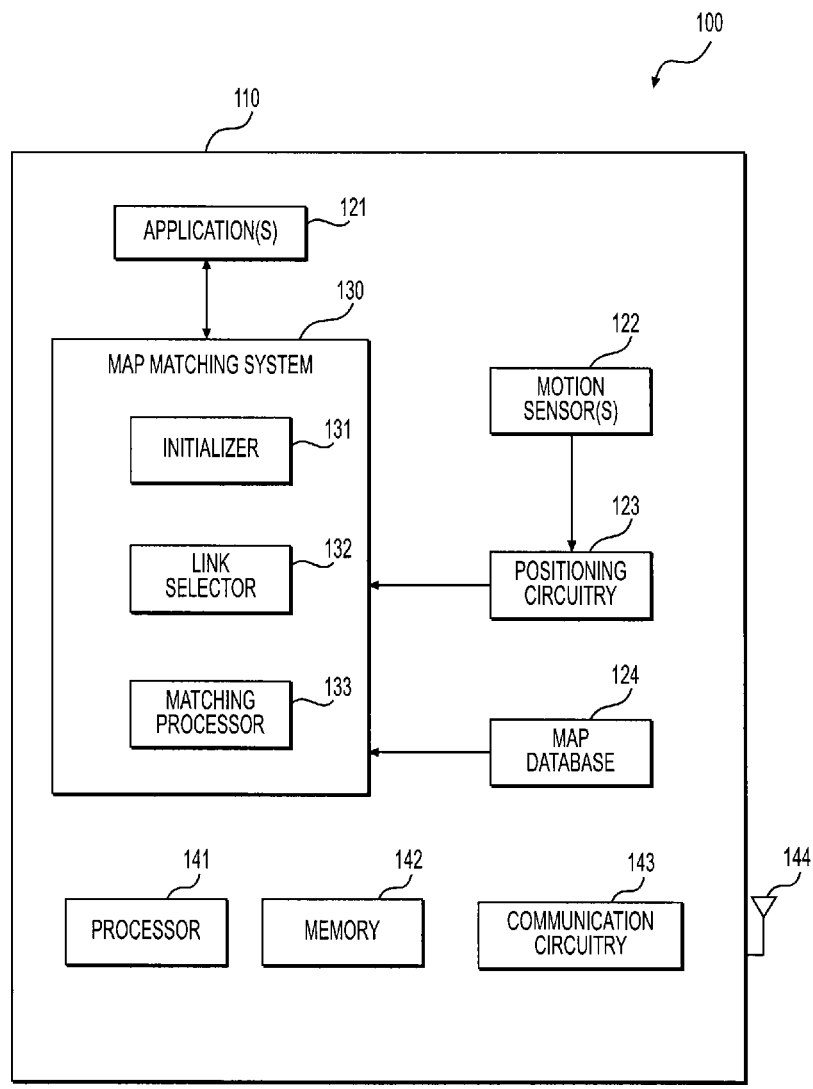
FIG. 1 shows an exemplary mobile device according to an embodiment of the disclosure.

FIG. 1 shows an exemplary mobile device 100 according to an embodiment of the disclosure. The mobile device 100 can include a map matching system 130, one or multiple applications 121, one or multiple motion sensors 122, positioning circuitry 123, a map database 124, a processor 141, a memory 142, communication circuitry 142 and an antenna 144. The mobile device 100 can be a mobile phone, a laptop computer, a tablet computer, a wearable electronic device, a portable navigation device, a navigation device installed in a vehicle, and the like.

In an embodiment, the map matching system 130 is configured to receive position data and heading information of the mobile device 100 from the positioning circuitry 123 and map data from the map database 124, and accordingly perform a map matching process to determine a position of the mobile device 100, referred to as a matched position, on a road in a map. The position data indicates an estimated position of the mobile device 100 and the heading information indicates a direction of movement of the mobile device 100. As a result, the matched position can be provided to the applications 121 as location information needed for performing a location-based service.

The application 121 is configured to request location information from the map matching system 130 in order to perform the location-based service for a user of the mobile device 100. In an example, the application 121 is a navigation application. The navigation application receives location information from the map matching system 130 and displays the current location of the user on a map. In addition, the navigation application 121 can receive an input of a destination location from the touch panel of the mobile device, and calculate a route from the current location to the destination location and subsequently provide navigation service to the user. In other examples, the applications 121 can be applications providing point of interest information, traffic information or promotion information of sellers to the user of the mobile device 100. Those applications need the location information to function properly. When the user of the mobile device 100 starts the operation of the applications 121, the applications 121 triggers the map matching process performed by the map matching system 130.

The motion sensors 122 are configured to detect a moving state of the mobile device 100 and provide measurements of the moving state to the positioning circuitry 123. In various embodiments, the motion sensors 122 can include one or multiple of each of the following sensors: digital compass, gyroscope, accelerometer, and other functional sensors. In some embodiments, part or all of the motion sensors 122 are made using micro-electro-mechanical systems (MEMS) technology, thus having a small size and a low cost. The digital compass, also referred to as a magnetometer, is configured to detect orientation of the mobile device relative to the direction of earth magnetic field. The gyroscope is configured to measure angular velocity of the mobile device 100. Based on an initial orientation of the mobile device 100 and the measured angular velocity, a current orientation of the mobile device 100 at any time can be detected. The accelerometer is configured to measure a change of velocity (direction and speed of the movement) of the mobile device 100. Because the accelerometer is fixed to the mobile device 100 and not aware of the orientation of the mobile device 100, the direction of the change is measured relative to the mobile device 100. Aided by the orientation detected by the digital pass or the gyroscope, the change of velocity of the mobile device relative to a geographic coordinate system can be computed.

The positioning circuitry 123 is configured to provide position data and heading information to the map matching system 130. The position data can be expressed as geographic coordinates such as latitude, longitude and elevation, or other suitable format in various examples. The position data usually has errors due to the measurement accuracy of the positioning circuitry 123, thus a position of the mobile device 100 indicated by the position data generated at the position circuitry 123 is referred to as an estimated position. The positioning circuitry 123 can employ various technologies to fulfill its function in various embodiments. For example, the positioning circuitry 123 can include one or multiple positioning systems, such as a satellite-based positioning system, a radio-based positioning system, a dead-reckoning system, or other suitable navigation systems.

In an example, the positioning circuitry 123 includes a satellite signal receiver configured to receive positioning signals from a satellite system, such as the GPS, the GLObal NAvigation Satellite System (GLONASS), the Galileo navigation satellite system, the Beidou navigation satellite system, and the like. The receiver can calculate the distances between the satellites and the mobile device 100 based on the time difference between the transmitted and the received radio signals from the satellites, and subsequently determine the position of the mobile device 100. In another example, the positioning circuitry 123 uses a radio-based positioning system to estimate a location of the mobile device 100. The radio-based positioning system can receive signals, via the communication circuitry 143, from different base stations in a wireless network, such as a wireless local area network (WLAN) or a wireless cellular network. Based on the received signals, the radio-based positioning system can calculate distances from the user and the different base stations to obtain a user position. In the above described satellite-based or radio-based positioning system, a heading (direction of movement of the mobile device 100) and a speed of the mobile device 100 at a time can be calculated based on previously obtained positions.

In a further example, the positioning circuitry 123 includes a dead-reckoning system. The dead-reckoning system is initially provided with an original position and an original velocity (direction and speed of movement) from another source, and thereafter computes updated position and velocity based on measurements received from the motion sensors 122. The motion sensors 122 can detect a change of velocity of the mobile device 100 at a time instant. The positioning circuitry 123 can then calculate an updated velocity at a next time instant based on a previous velocity and the change of velocity. Based on the velocity at each time instant, updated position and heading of the mobile device (direction of movement) at any time instant can be obtained. The original position and the original velocity can be obtained from other positioning system, such as the satellite-based positioning system or radio-based positioning system as described above. Alternatively, the original position can be provided by the user of the mobile device via a user interface in the applications 121, and the original velocity can be detected by the motion sensors 122, e.g., the user is in a stationary state thus having a zero initial velocity.

According to an aspect of the disclosure, different positioning systems are preferred under different environmental situations. For example, when the mobile device 100 is outside of buildings, the mobile device 100 is able to receive the satellite signals with enough strength, and the satellite-based positioning system is preferred to provide accurate location information. When the mobile device 100 is inside a building, satellite signals may not have enough strength for location determination, and thus the dead-reckoning system or WLAN-based positioning system can be used.

The map database 124 is configured to provide map data to the map matching system 130 when queried by the map matching system 130. In an embodiment, the map database 124 is organized under a hierarchical folder structure and the folders maps to directories in a file system in the mobile device 100. The database 124 can store one or multiple maps. In an embodiment, the maps in the database 124 are indoor floor maps used for indoor floor navigation. The map database 124 can provide map data defining the structure of link, node, and region in an indoor floor map. Link represents a passageway which the mobile device can move along. Region represents an area of which the mobile device can move within a boundary. Node represents a connection between the links or a link and a region.

FIG. 2 shows exemplary map data formats 200 according to an embodiment of the disclosure. The map data are stored in the formats 200. The formats 200 include a format 210 for a node, a format 220 for a link, and a format 230 for a region.

A node is defined as a point (i.e., location). The format 210 for each node can have fields of an object identifier, a latitude, a longitude, and other attributes as shown in FIG. 2. In a process of vector map generation, each node can be covered by an endpoint of a link, or covered by boundary of a region. A link is defined as a directed graph with direction information. The format 220 for each link can have fields of an object identifier, identifiers of a starting node and an end node, a length, a heading, and other attributes as shown in FIG. 2. In a process of vector map generation, the endpoints of each link can be covered by nodes. A region is defined as an area with vertices. The format 230 for each region can have fields of an object identifier, an identifier of vertex of the region, an identifier of a node, and other attributes as shown in FIG. 2. In a process of vector map generation, the boundary of region can contain at least a node.

In FIG. 1, the maps in the map database 124 can be downloaded from a remote server computer via a network, or obtained from a local computer in various embodiments. In an embodiment, the SQLite is used in the map database 124 to store and manage the map data. The SQLite is a relational database management system contained in a C programming library. The SQLite can read and write directly to ordinary disk files.

The map matching system 130 is configured to receive position data indicative of an estimated position of the mobile device 100 and heading information indicative of a heading of the mobile device 100 from the positioning circuit 123, receive map data from the map database 124, and determine a matched position on a link in a map using the map matching process. According to an aspect of the disclosure, the map matching process is based on a hypothesis that the mobile device 100 or the user moves along a link. Thus, an estimated position of the mobile device can be matched to a link, referred to as a matched link, and subsequently a matched position on the matched link can be determined. As a result, the matched position on the matched link can be used as the location of the mobile device 100 or the user, and subsequently used for location-based services provided by the applications 121. In addition, the map matching process can be performed effectively based on an accurate indoor floor map due to a limited number of possible links in the indoor floor map, even with relatively inaccurate position data received from the positioning circuit 123.

According to an aspect of the disclosure, the map matching process uses an equivalent distance from an estimated position to a candidate link to determine the candidate link to be the matched link corresponding to the estimated position. The equivalent distance from an estimated position to a candidate link can represent a combination of contributions of two factors: (1) a minimum distance between the estimated position and the candidate link, and (2) a heading difference between the mobile device and the candidate link. In an embodiment, the minimum distance between the estimated position and the candidate link is the shortest distance from the estimated position to points in the candidate link. The heading difference between the mobile device and the candidate link is the size of the angle (either an acute angel or a right angel) between the heading of the mobile device 100 at the estimated position and a candidate link when the candidate link is a line segment. In an embodiment, when the candidate link is a curve, the heading difference may be the size of the angle between the heading of the mobile device 100 and a tangent line of the curve passing a point that has a minimum distance to the estimated position. The heading difference can be expressed in radians, degrees or other suitable unit in various embodiments. During the map matching process, a shorter minimum distance or a smaller heading difference leads to a shorter equivalent distance, and accordingly a candidate link having the shortest equivalent distance among other candidate links is determined to be a matched link.

In an example, the equivalent distance can be represented using the following equation, Equivalent distance=$f_1(d)+f_2(\theta)$, where d represents the minimum distance and $f_1$(d) is a function of the minimum distance that contributes to the importance of minimum distance in determining the matched link, while θ represents the heading difference, and $f_2(\theta)$ is a function of the heading difference that contributes to the importance of heading difference in determining the matched link. The functions $f_1$(d) and $f_2(\theta)$ can take various suitable forms in various embodiments, and can be determined based on experiments and application environmental situations. In an example, the equation takes the following form, $$\text{Equivalent distance} = w_d \cdot \frac{d}{D} + w_\theta \cdot \sin(\theta),$$

where $w_d$ represents a minimum distance weight coefficient, $w_\theta$ represents a heading difference weight coefficient, D represents a maximum value in a range of possible minimum distances corresponding to a certain environmental situation. The parameters $w_d$, $w_\theta$, and D can be determined through experiments under certain application situations.

As shown in FIG. 1, the map matching system 130 includes an initializer 131, a link selector 132 and a matching processor 133. The initializer 131 is configured to perform an initialization for the map matching process. Specifically, in an embodiment, the initializer 131 determines a matched position, referred to as an initial matched position, on an initial matched link in an indoor floor map based on position data and heading information received from the positioning circuit 123. The position data includes a first estimated position and the heading information includes a first heading of the mobile device 100 corresponding to the first estimated position.

In an example, the initialization includes the following three steps. In the first step, the initializer 131 selects initial candidate links based on a predefined minimum distance threshold and a predefined heading difference threshold. The initializer 131 traverses all the links contained in the indoor floor map, and the links that satisfy the following two conditions are selected to be the initial candidate links: (1) the minimum distance from the first estimated position to the link is shorter than the minimum distance threshold, and (2) the heading difference between the first heading of the mobile device 100 and the heading of the link is smaller than the heading difference threshold. In the second step, the initializer 131 determines an initial matched link based on an equivalent distance from the first estimated position to the initial candidate links. The initializer 131 calculates equivalent distances for all initial candidate links, and the link to which the equivalent distance from the first estimated position is shortest is determined to be the initial matched link. In the third step, the initializer 131 determines an initial matched position corresponding to the first estimation position on the initial matched link. Specifically, the initializer 131 projects the first estimated position onto the initial matched link to obtain the initial matched position. For example, a point on the initial matched link which has a shortest distance to the first estimated position among other points on the initial matched link is selected to be the initial matched position. As a result, information of the initial matched position on the initial matched link is transmitted to the link selector 132 to be used in latter part of the map matching process.

The map matching system 130 is configured to operate in an iterative way. The map matching system 130 continually receives position data and heading information from the positioning circuitry 123. After the initialization process performed by the initializer 131, in each subsequent iteration, based on the position data and heading information, a matched position on a matched link corresponding to the estimated position is determined. During this iterative process, a matched position previously determined in a last iteration is referred to as a previous matched position, and accordingly, a matched position determined in the current iteration based on the previous matched position is referred to as a current matched position.

In FIG. 1, the link selector 132 is configured to select candidate links based on historical information and road network topology information in each subsequent iteration. Specifically, the historical information is a previous matched position on a matched link in the indoor floor map, while the road network topology information is a path length from the previous matched position to a link in the indoor floor map. Links to which a path length from the previous matched position is shorter than a predefined path length threshold are selected to be the candidate links. As a result, information of the selected candidate links is transmitted to the matching processor 133.

The matching processor 133 is configured to determine a matched link based on an equivalent distance from an estimated position to the candidate links selected by the link selector 132. Specifically, during each subsequent iteration, the matching processor 133 receives position data and heading information from the positioning circuitry 123 and computes equivalent distances from the estimated position to each candidate link. Accordingly, a link in the candidate links that has a shortest equivalent distance is selected to be the matched link.

In an embodiment, the matching processor 133 determines a matched link by comparing equivalent distances from an estimated position to a previous matched link and the candidate links. During the iterative process described above, a previous matched link refers to a matched link previously determined in a last iteration, and accordingly a current matched link refers to a matched link determined in the current iteration based on the previous matched position. In an example, initially, the previous matched link is used as a candidate matched link. Then, the matching processor 133 computes a first equivalent distance from the estimated position to the candidate matched link, and subsequently selects a first candidate link from the candidate links and computes a second equivalent distance from the estimated position to the first candidate link. Thereafter, the matching processor 133 compares the first equivalent distance with the second equivalent distance. If the difference between the first equivalent distance and the second equivalent distance is larger than a predefined threshold and the second equivalent distance is shorter than the first equivalent distance, the first candidate link is selected to substitute the previous candidate matched link to be the new candidate matched link. Otherwise, the previous candidate matched link is still used as the candidate matched link for subsequent comparisons. Subsequently, a second candidate link can be selected from the candidate links, and the operation of the comparison can be repeated again with the candidate matched link. Consequently, when all candidate links have been processed in the above comparison process, the final candidate matched link can be determined as the current matched link.

The matching processor 133 is further configured to determine a current matched position corresponding to the estimated position. Specifically, the matching processor 133 projects the estimated position onto the matched link to obtain the current matched position. For example, a point on the matched link which has a shortest distance to the estimated position among other points on the matched link is selected to be the current matched position. As a result, information of the current matched position is transmitted to the applications 121 to be used for various location-based services.

The map matching system 130 can be implemented using any suitable software, hardware, or combination of software and hardware in various embodiments. The software can include computer-executable instructions that are stored in the memory 142 and when executed by the processor 141 perform the functions of the map matching system 130 described above. The hardware can be one or multiple discrete circuits or integrated circuits (ICs). The IC can be an application-specific integrated circuit (ASIC), a Field-programmable gate arrays (FPGAs), and the like.

The memory 142 is configured to store computer-readable instructions or program modules of various software, such as the applications 121, software for implementing, with or without other hardware, the map matching system 130, the motion sensors 122, the positioning circuit 123, the map database 124, or the communication circuitry 143. The memory 142 uses a variety of computer storage media in various embodiments, such as random access memory (RAM), read-only memory (ROM), electrically erasable programmable read-only memory (EEPROM), flash memory, compact disc read-only memory (CD-ROM), digital versatile disk (DVD) or other optical disk storage, magnetic cassettes, magnetic tape, magnetic disk storage, and the like.

The processor 141 is configured to execute the computer-readable instructions or program modules stored in the memory 142 to perform various functions of the components of the mobile device 100 as described above.

The communication circuitry 143 is configured to provide communication channels for the components in the mobile device 100 to communicate with other computers or devices via various communication networks. In an example, the other computers or devices include a server where map data is stored, and the mobile device 100 can communicate with the server to download the map data. In another example, the other computers or devices include a server where location-based service information, such as point of interest information, traffic information or promotion information, and the like, is stored, and the mobile device 100 can communicate with the server to receive the location-based service information. The various communication networks can include WLANs, wired-LANs, wireless cellular networks, Internet, wide-area networks, and the like, and accordingly, the communication circuitry 143 can operate with various communication protocols, such as WiFi, Bluetooth, Internet protocols, wireless cellular network protocols (e.g. general packet radio service (GPRS), wideband code division multiple access (WCDMA), Long-Term Evolution (LTE)), any other communication protocols, or any combination thereof.

In addition, the communication circuitry 143 is configured to receive wireless signals from different base stations in a wireless network, such as a wireless local area network (WLAN) or a wireless cellular network, and provide information needed by a radio-based positioning system to the positioning circuitry 123.

The antenna 144 is configured to receive or transmit wireless signals to support the wireless communications performed by the communication circuitry 143.

Figure 3:
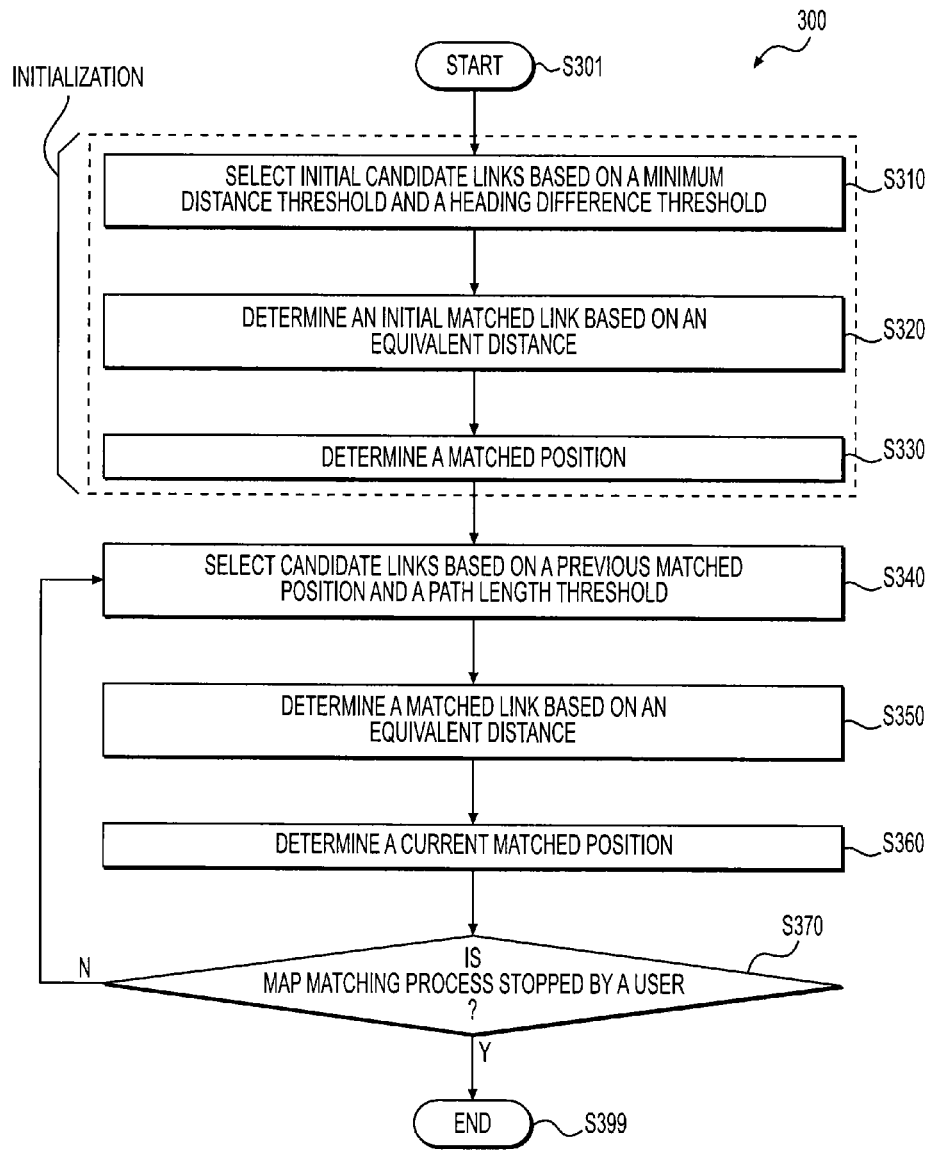
FIG. 3 shows a flowchart of an exemplary map matching process according to some embodiments of the disclosure.

FIG. 3 shows a flowchart of an exemplary map matching process 300 according to some embodiments of the disclosure. The process 300 can be performed by the map matching system 130 in the FIG. 1 example and an indoor floor map received from the map database 124 is used for the process 300. In addition, the process 300 includes an initialization phase that includes steps S310 to S330 to determine an initial matched position on an initial matched link. The process 300 starts from S301 and proceeds to S310.

At S310, initial candidate links are selected based on a minimum distance threshold and a heading difference threshold. In an example, the initializer 131 in FIG. 1 receives position data indicative of a first estimated position and heading information indicative of a first heading of the mobile device 100 from the positioning circuitry 123, and computes minimum distances from the first estimated position to links in the indoor floor map and the heading difference between the mobile device and the heading of the links in the map. Accordingly, the links with minimum distances shorter than a minimum distance threshold and heading difference smaller than the heading difference threshold are selected to be the initial candidate links.

At S320, an initial matched link is determined based on an equivalent distance from the first estimated position to the initial candidate links. A link in the initial candidate links with the shortest equivalent distance is selected to be the initial matched link.

At S330, a matched position corresponding to the first estimated position is determined. For example, the first estimated position is projected to the initial matched link to obtain the initial matched position.

At S340, candidate links are selected based on a previous matched position and a path length threshold. In an example, path lengths from the previous matched position to all links in the indoor floor map are computed, and links with a path length shorter than the path length threshold are selected to be the candidate links.

At S350, a matched link is determined based on an equivalent distance between an estimated position and the candidate links determined at S340. In an example, the equivalent distances are calculated based on an estimated position indicated in position data received from the positioning circuitry 123 and a heading of the mobile device 100 indicated in heading information received from the positioning circuitry 123. A link in the candidate links to which the equivalent distance from the estimated position is the shortest is selected to be the matched link.

At S360, a current matched position corresponding to the estimated position is determined. For example, the estimated position is projected to the matched link to obtain the current matched position. As a result, the current matched position is provided as location information to applications that use the location information to provide location-based service to a user of the mobile device 100.

At S370, it is determined if the map matching process 300 is stopped. For example, when the user of the mobile device 100 issues a command via a user interface to stop the operation of the related applications 121, the process 300 can be stopped. When the process 300 is stopped by a user, the process 300 proceeds to S370 and terminates. Otherwise, the process 300 proceeds to S340.

It is noted that although the above descriptions of the mobile device 100 and the map matching process 300 refers to indoor floor map or indoor navigation, the scope of the present disclosure is not limited to the indoor floor map or indoor navigation, and the functions and processes described above can be applied to outdoor situations and applications where outdoor map data is used in the map matching process.

FIG. 4 shows a diagram illustrating a map data distribution system 400 according to some embodiments of the disclosure. As shown, the map data distribution system 400 can include a mobile device 410, communication networks 420, a map data distribution server 430, and a computer 440. In various embodiments, a user of the mobile device 410 can obtain map data from the map data distribution server 430 or the computer 440, and uses the map data for location-based services, such as indoor navigation.

The mobile device 410 is similar to the mobile device 100, and can include a map matching system that provides location information used by applications to provide location-based service to a user of the mobile device 410. Accordingly, the mobile device 410 needs map data to perform map matching process properly. In addition, the mobile device 410 can include communication circuitry similar to the communication circuitry 143 in the FIG. 1 example, and can communicate with the communication networks 420.

The communication networks 420 provide a communication channel between the mobile device and the map data distribution server 430. The networks 420 can include a WLAN, a wired-LAN, a wireless cellular network, the Internet, a wide-area network, or a combination thereof.

The map data distribution server 430 is configured to respond to request from the mobile device 410 and transmit map data to the mobile device 410. The map data distribution server 430 can include a storage 431 storing map data 432. The storage 431 can use various computer storage media in various embodiments, such as RAM, ROM, EEPROM, flash memory, CD-ROM, DVD or other optical disk storage, magnetic disk storage, and the like. In addition, the map data distribution server 430 can include a server application that can respond to a request from a client software in the mobile device 410.

In operation, a client application in the mobile device 410 can transmit a request to the map distribution server 430 requiring the map data 432. The request can include identifiers of one or more maps. In response, the map distribution server 430 can transmit map data associated with the identifiers to the mobile device 410.

The computer 440 can be a desktop computer, a laptop, a mobile phone, and the like, and communicate with the mobile device 410 through a communication channel 450. The communication channel 450 can be wireless, for example, using Bluetooth or WiFi Direct, or wired, for example, using universal serial bus (USB) cable or Ethernet cable. The computer 440 can have a storage 441 storing map data 442, and when connected with the mobile device 410 via the communication channel 450, transmit the map data 442 to the mobile device. The storage 441 can use various computer storage media similar to that used by storage 431 in various embodiments.

It is noted that the map data distribution system 400 can include multiple mobile devices 410, multiple computers 440, and multiple map data distribution servers 430. In an embodiment, multiple map data distribution servers 430 and computer 440 are deployed at multiple different areas to provide map data to multiple different users of the mobile devices 410.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus for determining a matched position of a mobile device in a map, the apparatus having a map matching system, the map matching system comprising:
 a link selector that is configured to select candidate links from links in the map, wherein a link in the map having a path length between a previous matched position and the link in the map shorter than a path length threshold is selected to be a candidate link; and
 a matching processor that is configured to,
  determine a matched link in the candidate links based on an equivalent distance from an estimated position of the mobile device to a link in the candidate links, wherein the estimated position of the mobile device is indicated by position data generated from a positioning circuit in the mobile device,
  determine a current matched position on the matched link, and
  provide the current matched position to a circuit providing a location-based service.

2. The apparatus of claim 1, wherein the map matching system further comprising:
 an initializer that is configured to determine a matched position based on an equivalent distance from a first estimated position to an initial candidate link in the map.

3. The apparatus of claim 2, wherein the equivalent distance from the estimated position to the link in the candidate links represents a combination of contributions of the minimum distance between the estimated position and the link in the candidate links and a heading difference between the mobile device and the link in the candidate links, and
 the equivalent distance from the first estimated position to the initial candidate link in the map represents a combination of contributions of the minimum distance between the first estimated position and the initial candidate link in the map and a heading difference between the mobile device and the initial candidate link in the map.

4. The apparatus of claim 2, wherein the initializer determines the matched position based on the equivalent distance from the first estimated position to the initial candidate link in the map comprises:
 select initial candidate links based on a minimum distance threshold and a heading difference threshold;
 determine an initial matched link based on an equivalent distance from the first estimated position to the initial candidate link in the map; and
 determine the matched position on the initial matched link.

5. The apparatus of claim 1, wherein the matching processor determines the matched link in the candidate links based on the equivalent distance from the estimated position to the link in the candidate links comprises:
 select a link in the candidate links to which the equivalent distance from the estimated position is the shortest to be the matched link.

6. The apparatus of claim 1, wherein the matching processor determines the current matched position on the matched link comprises:
 project the estimated position onto the matched link to determine the current matched position on the matched link.

7. The apparatus of claim 1, further comprising:
 the positioning circuitry that is configured to generate position data indicative of the first estimated position and the estimated position, and heading information indicative of a heading of the mobile device;
 motion sensors that are configured to detect a moving state of the mobile device and provide measurements of the moving state to the positioning circuitry; and
 a map database that is configured to provide map data to the map matching system,
 wherein the map matching system is configured to receive the position data and the heading information from the positioning circuitry and receive map data from the map database.

8. The apparatus of claim 7, wherein the positioning circuitry comprises one of the following positioning systems:
 a satellite-based positioning system;
 a radio-based positioning system; and
 a dead-reckoning system.

9. The apparatus of claim 1, wherein the map is an indoor floor map.

10. A method for determining a matched position of a mobile device in a map, comprising:
 selecting candidate links from links in the map, wherein a link in the map having a path length between a previous matched position and the link in the map shorter than a path length threshold is selected to be a candidate link;

determining a matched link in the candidate links based on an equivalent distance from an estimated position of the mobile device to a link in the candidate links, wherein the estimated position of the mobile device is indicated by position data generated from a positioning circuit in the mobile device;

determining a current matched position on the matched link; and providing the current matched position to a circuit providing a location-based service.

11. The method of claim 10, further comprising:

determining a matched position based on an equivalent distance from a first estimated position to an initial candidate link in the map.

12. The method of claim 11, wherein the equivalent distance from the estimated position to the link in the candidate links represents a combination of contributions of the minimum distance between the estimated position and the link in the candidate links and a heading difference between the mobile device and the link in the candidate links, and the equivalent distance from the first estimated position to the initial candidate link in the map represents a combination of contributions of the minimum distance between the first estimated position and the initial candidate link in the map and a heading difference between the mobile device and the initial candidate link in the map.

13. The method of claim 11, wherein determining the matched position based on the equivalent distance from the first estimated position to the initial candidate link in the map comprises:

selecting initial candidate links based on a minimum distance threshold and a heading difference threshold;

determining an initial matched link based on an equivalent distance from the first estimated position to the initial candidate link in the map; and determining the matched position on the initial matched link.

14. The method of claim 10, wherein determining the matched link in the candidate links based on the equivalent distance from the estimated position to the link in the candidate links comprises:

selecting a link in the candidate links to which the equivalent distance from the estimated position is the shortest to be the matched link.

15. The method of claim 10, wherein determining the current matched position on the matched link comprises:

projecting the estimated position onto the matched link to determine the current matched position on the matched link.

16. The method of claim 10, further comprising:

receiving position data indicative of the first estimated position and the estimated position and heading information indicative of a heading of the mobile device from positioning circuitry; and receiving map data from a map database.

17. The method of claim 16, wherein the positioning circuitry comprises one of the following positioning systems:

a satellite-based positioning system;

a radio-based positioning system; and a dead-reckoning system.

18. The method of claim 10, wherein the map is an indoor floor map.

* * * * *